United States Patent
Toros (10) Patent No.: US 10,195,898 B2
(45) Date of Patent: Feb. 5, 2019

(54) SYSTEM FOR PREVENTING AQUAPLANING IN A VEHICLE

(71) Applicant: Easy Rain I.S.R.L., Pordenone (IT)

(72) Inventor: Giorgio Toros, Vigodarzere (IT)

(73) Assignee: EASY RAIN I.S.P.A., Pordenone (IT)

( * ) Notice: Subject to any disclaimer, the term of this patent is extended or adjusted under 35 U.S.C. 154(b) by 175 days.

(21) Appl. No.: 14/868,160

(22) Filed: Sep. 28, 2015

(65) Prior Publication Data
US 2016/0089933 A1    Mar. 31, 2016

(30) Foreign Application Priority Data
Sep. 29, 2014   (IT) .............................. TO2014A0773

(51) Int. Cl.
| | |
|---|---|
| *B60B 39/02* | (2006.01) |
| *B60B 39/10* | (2006.01) |
| *B60B 39/08* | (2006.01) |

(52) U.S. Cl.
CPC .......... *B60B 39/021* (2013.01); *B60B 39/023* (2013.01); *B60B 39/025* (2013.01); *B60B 39/083* (2013.01); *B60B 39/10* (2013.01); *B60B 39/026* (2013.01); *B60T 2210/13* (2013.01)

(58) Field of Classification Search
None
See application file for complete search history.

(56) References Cited

U.S. PATENT DOCUMENTS

| | | | | |
|---|---|---|---|---|
| 3,680,885 | A * | 8/1972 | DeCardi | B60B 39/00 244/103 R |
| 4,063,606 | A * | 12/1977 | Makinson | B60B 39/026 180/271 |
| 5,100,175 | A * | 3/1992 | Swallow | B60B 39/023 239/567 |
| 5,273,315 | A * | 12/1993 | Debus | B60B 39/00 280/160 |

(Continued)

FOREIGN PATENT DOCUMENTS

| | | |
|---|---|---|
| DE | 2600787 A1 | 7/1977 |
| DE | 3417048 A1 | 3/1985 |

(Continued)

OTHER PUBLICATIONS

Machine Translation of DE 3417048.*
Italian Search Report and Written Opinion dated May 20, 2015 for Application No. TO20140773.

*Primary Examiner* — Navid Ziaeianmehdizadeh
(74) *Attorney, Agent, or Firm* — Patterson + Sheridan, LLP (57) ABSTRACT

A system for preventing aquaplaning in a vehicle, said system comprising: a tank suitable for containing a fluid; sensor means configured to reveal the conditions of the vehicle and/or the environment in which the vehicle is found, and in particular, the conditions of a street surface; injector means configured to generate a jet of fluid on said street surface, said injector means being associated with at least one wheel of the vehicle; a control unit associated with sensor means and configured for controlling said injector means according to the conditions revealed by said sensor means. A unique feature of the system of the present invention consists in the fact that said injector means comprise at least one "fan-type" nozzle and equipped with a (Continued)

slit-shaped outlet opening suitable for creating a flat jet of fluid.

20 Claims, 5 Drawing Sheets

(56) References Cited

U.S. PATENT DOCUMENTS

| | | | | |
|---|---|---|---|---|
| 5,350,035 A * | 9/1994 | Bodier | ............... | B60B 39/025 180/197 |
| 5,481,455 A * | 1/1996 | Iwata | ............... | B60T 8/48 180/197 |
| 5,502,433 A * | 3/1996 | Breuer | ............... | B60R 16/0237 152/210 |
| 5,532,678 A * | 7/1996 | Kin | ............... | G01P 3/48 180/197 |
| 5,723,768 A * | 3/1998 | Ammon | ............... | B60C 23/061 180/271 |
| 6,125,864 A * | 10/2000 | Morikawa | ............... | B08B 9/0813 134/167 R |
| 6,270,118 B1 * | 8/2001 | Ichikawa | ............... | B60B 39/024 280/757 |
| 6,371,532 B1 * | 4/2002 | Skarie | ............... | B60B 39/025 291/2 |
| 6,488,217 B1 * | 12/2002 | Donastorg | ............... | B60B 39/02 180/271 |
| 6,546,791 B2 * | 4/2003 | Yurjevich | ............... | G01M 17/02 340/438 |
| 7,370,888 B2 * | 5/2008 | Byrne | ............... | B60B 39/00 239/290 |
| 8,528,936 B2 * | 9/2013 | Johnson | ............... | B62D 25/168 180/271 |
| 9,139,175 B2 * | 9/2015 | Borges | ............... | B60T 8/176 |
| 9,200,420 B2 * | 12/2015 | Bramlett | ............... | E01H 8/105 |
| 9,440,493 B1 * | 9/2016 | Ahern | ............... | B60B 39/022 |
| 2004/0070265 A1 * | 4/2004 | Sakai | ............... | B60B 39/023 303/1 |
| 2004/0262425 A1 * | 12/2004 | Sakai | ............... | B05B 12/12 239/128 |
| 2008/0092924 A1 * | 4/2008 | Collin | ............... | F22B 37/483 134/18 |
| 2009/0084411 A1 * | 4/2009 | Woodcock | ............... | B08B 9/00 134/22.18 |
| 2015/0102594 A1 * | 4/2015 | Blandina | ............... | B60B 39/025 280/855 |

FOREIGN PATENT DOCUMENTS

| | | |
|---|---|---|
| EP | 2058141 A1 | 5/2009 |
| WO | 2013179159 A1 | 12/2013 |

* cited by examiner

SYSTEM FOR PREVENTING AQUAPLANING IN A VEHICLE

CROSS-REFERENCE TO RELATED APPLICATIONS

This application claims benefit of Italian patent application number TO2014A000773, filed Sep. 29, 2014, which is herein incorporated by reference.

BACKGROUND OF THE INVENTION

Field of the Invention

The present invention relates to a system for preventing aquaplaning in a vehicle, according to the preamble of claim 1.

Description of Prior Art

As known, aquaplaning is a floatation phenomenon of a moving vehicle on a layer of water extending on a street surface; more precisely, aquaplaning occurs when the water (typically of rainwater origin) is in such a quantity that no longer allows an adequate contact between the wheels of a vehicle and the street surface, or rather a suitable contact to allow the presence of enough friction to allow the vehicle to slow down or change direction. Consequently, in these conditions, the vehicle remains subject only to the rules of physics, essentially conserving the momentum and the direction that it had at the moment that the aquaplaning phenomenon was triggered.

It should be noted that the aquaplaning can be partial, when only some of the wheels of a vehicle are involved, generating (especially in curves) understeering or oversteering problems.

With the aim of trying to overcome the aquaplaning phenomenon, various solutions in the state-of-the-art have been studied and proposed.

SUMMARY OF THE INVENTION

In agreement with an approach of interest for the purposes of the present invention, the use of an anti-aquaplaning system is known in the state-of-the-art which is associated with a vehicle and that comprises:
 a fluid tank; and
 injector means configured for generating a jet of fluid on a street surface, said injector means being associated with at least one wheel of the vehicle, usually in proximity of the drive wheels.

In essence, said at least one injector projects a jet of fluid (in liquid form or gaseous form) onto the street surface in order to remove the water layer that stagnates on this surface.

However, the solutions known in the state-of-the-art have different and considerable disadvantages.

Indeed, a first typology of known-type solutions works in such a way to generate a jet of fluid which remains directed in a fixed way with respect to the vehicle, or rather, a jet of fluid that does not follow the path of the wheel, even when it is steered and the vehicle follows a curvilinear path.

In addition to not being effective in curvilinear paths, said first typology of solutions results in worsening the aquaplaning phenomenon, in that it removes the water from an area of unaffected street surface from the wheel and usually projects it precisely towards the area in which the wheel is directed.

A second typology of known-type solutions comprises a control unit associated with sensor means configured to reveal the conditions of the vehicle and/or the environment in which the vehicle is found (and in particular the conditions of the street surface), said control unit being configured in such a way to control the injector means configured to generate a jet of fluid according to the conditions revealed by said sensor means.

In particular, this second typology of solutions works in such a way so that the control unit is configured to control said injector means in such a way as to generate a jet of fluid in a direction that only follows the degree of steering of the wheel, or rather, always and in any case orienting the jet of fluid in front of said wheel.

However, even these solutions present drawbacks in that they are applied without giving the necessary attention to the dynamics of the vehicle and the effects caused by its advancing, in particular to the aerodynamic flows that hit the vehicle and the injector means during advancing of the vehicle itself; it should be noted that the relevance of said aerodynamic flows increases in a proportional manner with respect to the increase in speed of the vehicle.

Consequently, the solutions applied without a careful and precise consideration of the aerodynamic flows result in being ineffective and also dangerous. For example, consider the case in which a vehicle finds itself in an initial step of aquaplaning; in this situation, a jet of fluid oriented in such a way to only follow the degree of steering of the wheel would dangerously increase the amount of water to dispose of under the tire, which is already in a critical situation.

An additional disadvantage of the solutions known in the state-of-the-art consists in the fact that they absolutely do not take into consideration the fact that the jet of fluid must also contrast an aerodynamic flow that depends on the real dynamic state of the vehicle and whose importance increases in a proportional manner with respect to the increase in speed of said vehicle.

In this setting, the main object of the present invention is that of overcoming the drawbacks cited above, and to indicate a system for preventing aquaplaning in a vehicle, implemented in such a way as to take into due consideration the real dynamic state of the vehicle and the aerodynamic flows that hit the vehicle according to the real dynamic state of the vehicle, the relevance of said aerodynamic flows increasing in a proportional manner relative to the increase in speed of the vehicle.

Another object of the present invention is that of indicating a system for preventing aquaplaning in a vehicle, implemented in such a way as to generate a jet of fluid to remove the water from an area of affected street surface from the wheel, as well as to prevent projecting the water removed towards the area of street surface in which the wheel is directed.

An additional object of the present invention is that of indicating a system for preventing aquaplaning in a vehicle, implemented in such a way as to offer greater safety and reliability, in particular being able to effectively adapt itself automatically to the various driving conditions of the vehicle.

To achieve these objects, a system for preventing aquaplaning in a vehicle forms the subject of the present invention, incorporating the characteristics of the attached claims, which form an integral part of the present description.

BRIEF DESCRIPTION OF THE DRAWINGS

Further objects, characteristics and advantages of the present invention will become clear from the detailed description that follows and from the attached drawings, provided purely by way of illustrative and non-limiting example, wherein.

DETAILED DESCRIPTION

Figure 1:
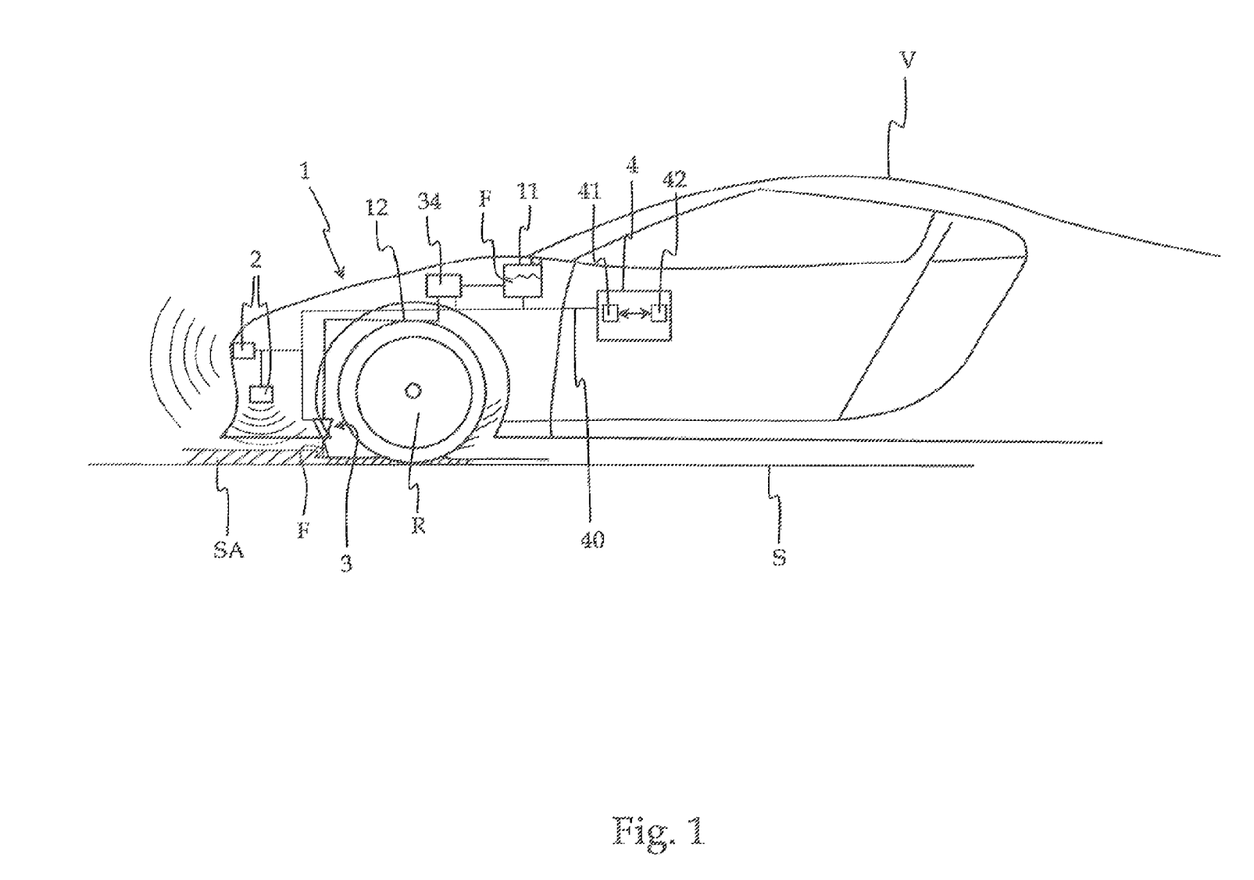
FIG. 1 represents a schematic view of a vehicle comprising a system for preventing aquaplaning according to the present invention.

With reference to FIG. 1, the reference V indicates, as a whole, a vehicle comprising a system (indicated altogether with the reference number 1) for preventing aquaplaning according to the present invention.

In FIG. 1, the system 1 according to the present invention is associated with a vehicle V composed of a car. However, the system 1 according to the present invention can also be associated with a different typology of the vehicle V, such as, for example a motorcycle (not shown in the attached figures).

The system 1 comprises a tank 11 configured to contain a fluid F; as will be explained in greater detail below, said fluid F is used by the system 1 to remove a layer of water SA present on the street surface S to prevent aquaplaning.

The tank 11 can contain a fluid F consisting of air, water, or a mixture of fluids. For example, said tank 11 can be composed of a dedicated tank 11 or a tank 11 configured to contain a windscreen wiper liquid (not shown in the figures) of the vehicle V; alternatively, said tank 11 can be associated with a cooling circuit (also not shown) of the vehicle V in such a way to withdraw the liquid from said cooling circuit.

The filling operation of the tank 11 can be carried out by the user. In the case in which the fluid F consists of water, the tank 11 can essentially be filled in the same manner in which a container is filled with the windscreen wiper liquid. In the case in which the fluid F consists of air, the tank 11 can essentially be filled in the same manner in which a tire is inflated.

Preferably, said tank 11 is controlled electronically, in order to verify the filling level, the effectiveness, and to indicate to the user when to supply and carry out the filling and/or other operations, as well as to prevent possible ice formations.

The system 1 also comprises sensor means 2 configured to reveal the conditions of the vehicle V and/or the environment in which said vehicle V is found, and in particular the conditions of a street surface S.

Preferably, said sensor means 2 comprise at least one sensor already mounted onboard the vehicle 1, in order to share the functionalities and to reduce the production costs of the system 1 according to the present invention.

In particular, said sensor means 2 can comprise at least one sensor of the following typologies:
  a speed sensor, which allows determining the speed at which the vehicle V is travelling;
  an angular velocity sensor, to determine if all the wheels R of the vehicle V rotate at the same speed, if a curved path is being followed, or if one or more wheels R are accelerating or decelerating without warning;
  a rain sensor, in order to determine if it is raining in the section of street surface S in which the vehicle V is found;
  an accelerometer and gyroscope, in order to determine any onboard passengers of the vehicle V;
  a water sensor, in order to determine if the wheels R of the vehicle V lift a determined amount of water;
  a sensor that determines the steering angle of the vehicle V, which allows it to ascertain if said vehicle V is proceeding on a rectilinear street surface S or not;
  a sensor of the inclination angle, which allows it to control both the longitudinal acceleration and the lateral one, together with the rolling and swerve rate in the case in which the vehicle V is a motorcycle;
  a sensor associated with least one tire of a wheel R of the vehicle V and suitable for activating system 1, exploiting the information coming from said at least one tire.

Safety systems can then be associated with said sensor means 2 (for example of type ABS, ESP and so on) that are usually mounted onboard the vehicle V; these security systems allow the provision of information relative to the speed and acceleration of the vehicle V, the angular velocity and steering angle for each wheel R, the presence of water on the street surface, braking conditions, and so on.

Moreover, said sensor means 2 can comprise sensors specifically studied and conceived for system 1, such as, for example, an infrared sensor suitable for verifying the presence of an anomalous layer of water that is about to be reached by the vehicle V, and so on.

In addition, the system 1 comprises injector means (indicated as a whole by the reference number 3 in the attached figures) configured to generate a jet of fluid F on said street surface S, said injector means 3 being associated with least one wheel R of the vehicle V.

Said injector means 3 can be associated with protection means (not shown in the figures), for example comprising:
  a heating element (not shown in the attached figures) suitable for preventing the formation of ice on said injector means, which would compromise its optimal performance; and
  at least one baffle element (also not shown in the attached figures), in particular positioned in such a way as to prevent the water lifted from the street surface S (for example, following the passage of the wheel R) interfering with the jet of fluid F generated from the injector means 3.

The system 1 also comprises a control unit 4 associated with said sensor means 2 and configured for controlling said injector means 3 according to the conditions revealed by said sensor means 2.

In detail, said control unit 4 comprises memory means 41 and a computer 42 configured to process instructions of a code contained in said memory means 41.

It should be noted that, in the attached figures, the ducts for the passage of the fluid F are indicated as a whole by the reference number 12, while the connections between the control unit 4 and the various components of the system 1 according to the present invention are indicated as a whole by the reference number 40.

Observing FIGS. 2a to 3b, it can be noted that, in agreement with the present invention, said injector means 3 comprise at least one "fan-type" nozzle 30 (which can also be defined "slit-type") and equipped with a slit-shaped outlet opening 31 suitable for creating a flat jet of fluid F (that can also be defined "blade-type").

In particular, said outlet opening 31 is essentially elliptic or rectangular in shape. It is clear that this conformation of the outlet opening 31 can be observed and appreciated in a plan or frontal view of said outlet opening 31, or rather in a view such as that of FIG. 2b (in which injector means 3 are shown according to the point of view of an observer essentially positioned on the same plane as the street surface S).

Figure 2A:
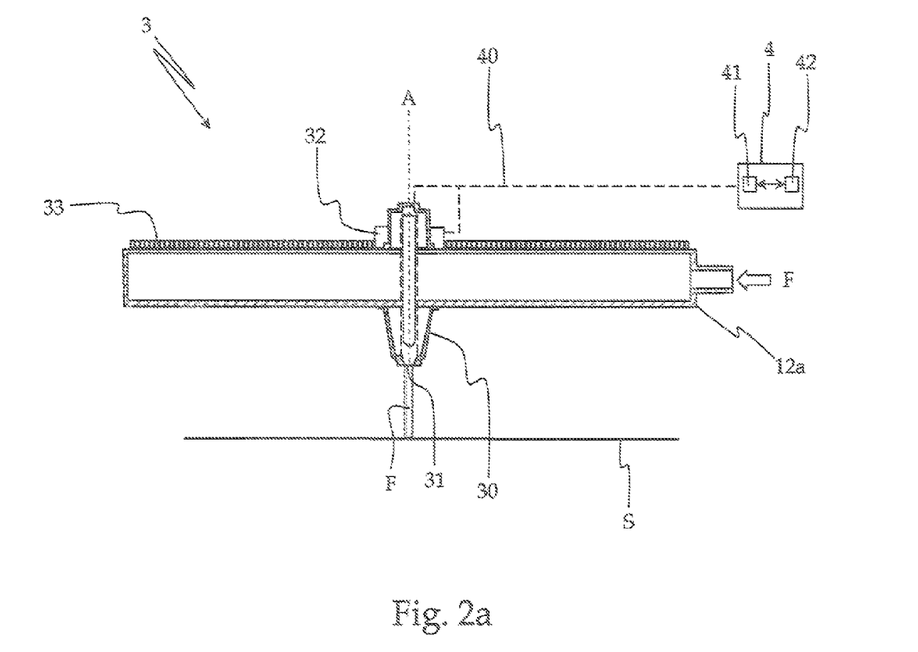
FIGS. 2a and 2b represent, respectively, a cross-sectional view and a plan view of a first embodiment of some components of the system for preventing aquaplaning according to the present invention.
Figure 2B:
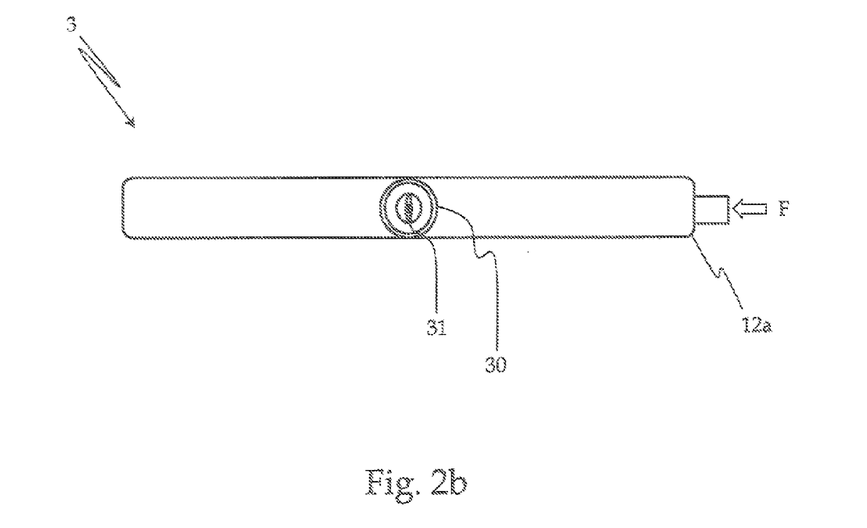
Figure 3A:
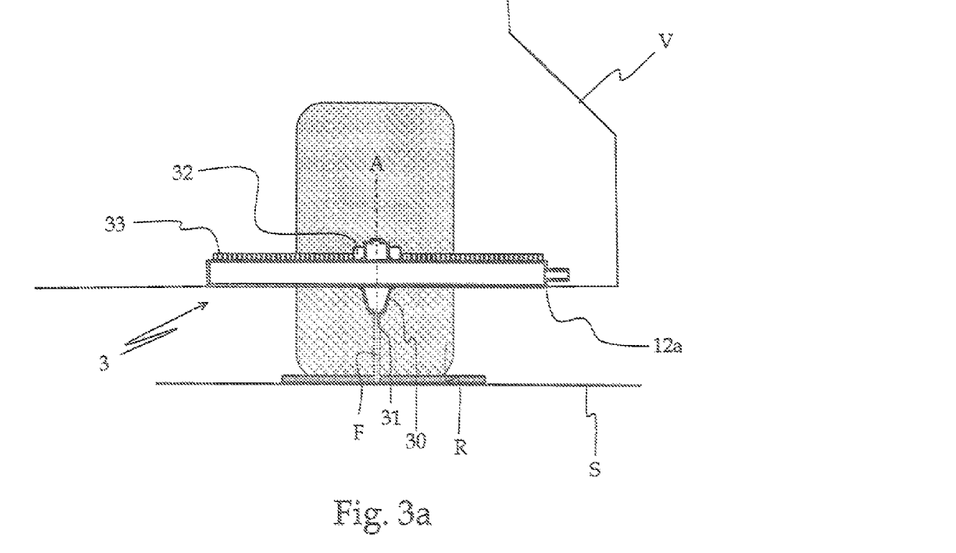
FIGS. 3a and 3b represent, respectively, a transverse view and a longitudinal view of a portion of the vehicle and of the first embodiment of the components referred to in FIGS. 2a and 2b.
Figure 3B:
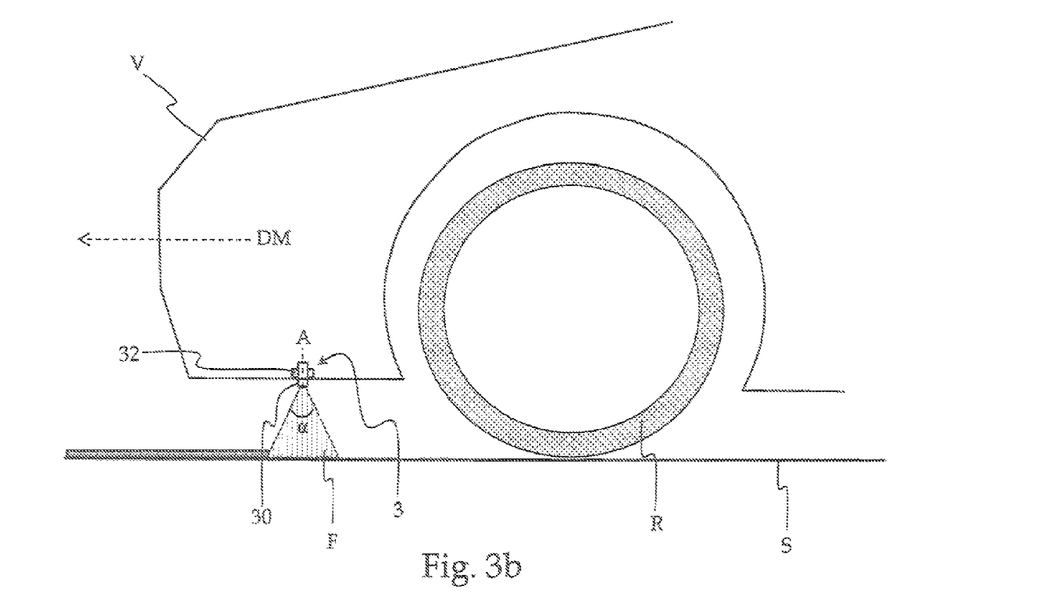

In a preferred embodiment, the system 1 comprises drive means 32 (represented in a simplified form in FIGS. 2a and 3a), which permit said at least one nozzle 30 to rotate around a rotation axis A, which essentially coincides with an axis of said outlet opening 31; in essence, as can be seen especially in FIGS. 2a, 3a and 3b, said rotation axis A essentially coincides with a longitudinal axis on which said nozzle 30 and said outlet opening 31 prevalently develop.

In particular, said drive means 32 are connected to the control unit 4, which is configured for controlling said drive means 32 according to the conditions revealed by said sensor means 2 and in such a way as to orient said slit-shaped outlet opening 31 essentially in the travel direction (indicated with a dashed arrow and the reference DM in FIG. 3b) of the vehicle V; in other words, the control unit 4 is configured for controlling said drive means 32 so as to orient the flat- or blade-jet of fluid F in an essentially parallel direction with respect to the travel direction DM of the vehicle V.

Said drive means 32 can comprise a motor, in particular of the electric type, associated with the nozzle 30 and controlled by the control unit 4 to orient the nozzle 30 and the direction of the jet of fluid F in a continuous and precise manner. Alternatively, said drive means 32 can comprise a magnetic- and/or electromagnetic-type system that orients the nozzle 30 and the direction of the jet of fluid F following the commands given by the control unit 4.

In particular, the control unit 4 is configured for controlling said drive means 32 according to the information revealed by said sensor means 2 (which can comprise a sensor associated with the steering system of the vehicle V, sensors for reading the speed of each single wheel R, sensors for reading the data relative to the brakes and accelerator and for reading the speed of the vehicle), as well as obtaining all the information already available from the other electronic devices.

Consequently, the control unit 4 can determine, in a continuous manner, the best rotation angle of the nozzle 30 with respect to the rotation axis by means of a mathematical algorithm deriving from the summary of all the information revealed by the sensor means 2 and by the electronic devices of the vehicle V and analyzed by the control unit 4.

The injection of the fluid F is therefore carried out taking into due consideration the conditions of understeering and/or oversteering, and the rectilinear direction or curved paths of the vehicle V; consequently, the fluid F will be injected without ever exclusively taking into consideration the direction of the wheels R, but always taking into consideration the important factor of the aerodynamic flow to be contrasted according to the travel direction DM of the vehicle V (i.e. taking into consideration the understeering and/or oversteering conditions, and the rectilinear direction or curved paths of the vehicle V), whose relevance increases in a proportional manner with respect to the increase in speed of said vehicle V.

Consequently, the system for preventing aquaplaning according to the present invention allows generation of a jet of fluid F to both remove the water from an area of affected street surface S from the wheel R, and to prevent projecting the water (already removed) onto the area of street surface S towards which the wheel is directed.

It is clear that the system 1 according to the present invention results in notably increasing the travel safety of a vehicle V with which it is associated, intervening both in a preventive way (before any aquaplaning can arise, impeding it and preventing it), and to remove any aquaplaning that is forming (in this case possibly cooperating with other safety devices of the vehicle V and allowing them to operate correctly even with the wheels R steered and in a curved or non-rectilinear trajectory).

Consequently, the system 1 according to the present invention results in being able to offer greater safety and reliability, and is able to effectively adapt itself in an automatic manner to the various driving conditions of the vehicle V with which it is associated. In particular, the unique provision of the nozzle 30, the outlet opening 31, the drive means 32 according to the present invention allow obtainment of a jet of fluid F that is not broken by the aerodynamic flow generated by the driving of the vehicle V and configured to effectively break the water layer from an area of affected street surface S from the wheel R and that it is intended to come to contact with said wheel R.

FIGS. 3a and 3b represent, respectively, a transverse view and a longitudinal view of a portion of the vehicle V and the injector means 3; from these figures, the particular orientation of the outlet opening 31 of the nozzle 30 can be noticed. In fact, in one transversal view of the vehicle V relative to the travel direction DM of said vehicle V (see FIG. 3a), it can be noted that said outlet opening 31 is shaped and oriented in such a way to generate a flat-blade jet of fluid F, in particular with the blade oriented in the same direction of the travel direction DM of said vehicle V. Instead, in one longitudinal view of the vehicle V (see FIG. 3b) it can be noted that said outlet opening 31 is shaped in such a way to generate a fan-type jet of fluid F, in particular with an angle $\alpha$ preferably comprised between 20° and 40°.

From FIGS. 2a and 3a it can be noted that the system 1 according to the present invention can then comprise translation means (not shown), which allow the movement of said at least one nozzle 30 along a guide 33 parallel to a transverse plane of said vehicle V. It should be noted that a contextual rotation of the nozzle 30 around the rotation axis corresponds to the translation on the guide 33 of at least one nozzle 30, so as to be able to orient the jet of fluid F (flat or blade-type) in the same direction of the travel direction DM of the vehicle V and in relation both to the understeering or the oversteering of the vehicle V, and in relation to the position of the nozzle 30 on the guide 33.

Preferably, said guide 33 is associated with the duct 12 for the passage of the fluid F, in particular with a terminal part 12a of said duct 12.

Figure 4A:
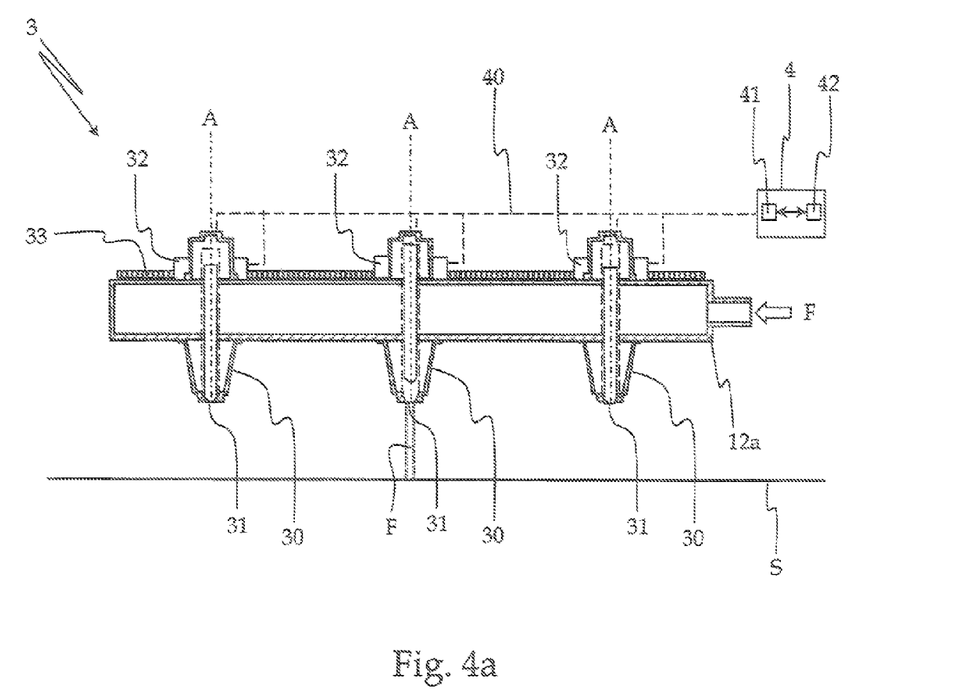
FIGS. 4a and 4b represent, respectively, a cross-sectional view and a plan view of a second embodiment of some components of the system for preventing aquaplaning according to the present invention.
Figure 4B:
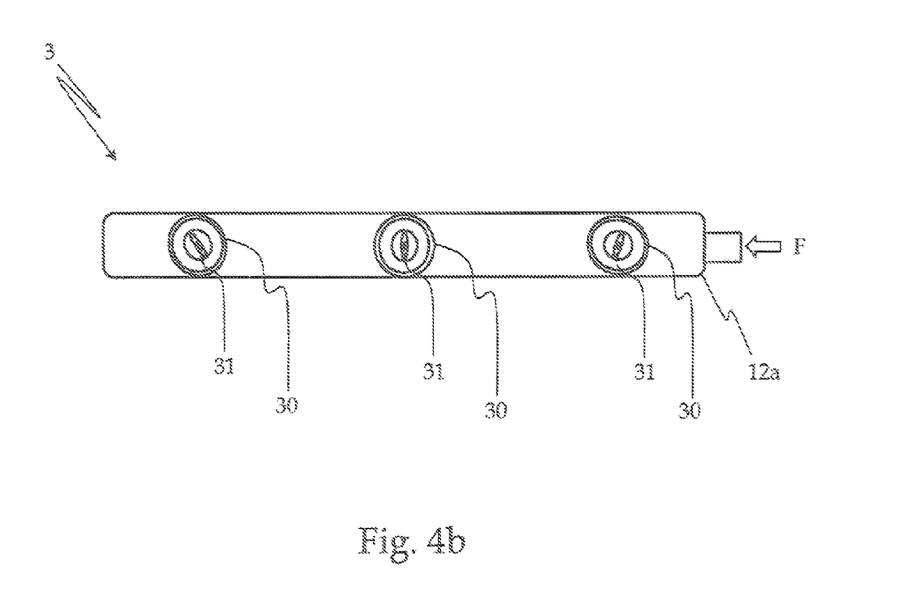

FIGS. 4a and 4b represent, respectively, a cross-sectional view and a plan view of a second embodiment of the system 1 according to the present invention.

In particular, in said second embodiment, injector means 3 of the system 1 comprise a plurality of "fan-type" nozzles 30 (which can also be defined "slit-type") and equipped with a slit-shaped outlet opening 31 suitable for creating a flat jet of fluid F (that can also be defined "blade-type").

Said nozzles 30 are associated with drive means 32 that allow each nozzle 30 to rotate around its own rotation axis A, which essentially coincides with an axis of the outlet opening 31 of each nozzle 30. Preferably, each nozzle 30 is rotated by said control unit 4 independently with respect to the others (as shown in FIG. 3b, in which the outlet openings 31 of each nozzle 30 are oriented in a different way from each other); however it is clear that each nozzle 30 can also be rotated by the controls of said control unit 4 in a way corresponding to the other nozzles 30 of said plurality of nozzles 30 (or rather, in such a way to present the outlet openings 31 of each nozzle 30 oriented in the same direction).

It should be noted that said nozzles 30 are positioned in succession along a direction parallel to a transversal plane of said vehicle V; moreover, said terminal part 12a of the duct 12 (or rather, the portion of the duct 12 on which the nozzles 30 are positioned) also develop along a direction essentially parallel to a transversal plan of the vehicle V (or rather, said terminal part 12a develops a direction essentially perpendicular to the travel direction DM of the vehicle V).

Moreover, each nozzle 30 of said plurality of nozzles 30 can be associated with translation means (not shown) for moving said at least one nozzle 30 along a guide 33 parallel to a transversal plane of said vehicle V, in particular said guide 33 being associated with the terminal part 12a of the duct 12 for the passage of the fluid F. However, it is clear that each nozzle 30 can be associated with the vehicle V in such a way to result in being positioned in a fixed manner with respect to a transversal plane of said vehicle V.

Returning to the description of FIG. 1, it can then be noted that the injector means 3 of the system 1 comprise at least one pump 34 for generating the operation pressure of the fluid F, in particular for generating a pressure comprised between 30 bar and 130 bar of the jet of fluid F.

In the representation of FIG. 1, said pump 34 is positioned between the tank 11 and the injector means 3; however, said pump 34 could be associated with said at least one nozzle 30.

It should be noted that the pump 34 results in being particularly important in the case in which the fluid F is formed of a liquid substance, for example, water; on the contrary, the pump 34 could be absent in the case in which the fluid F consists of compressed air.

From the description, the characteristics and the advantages of the system for preventing aquaplaning, subject of the present invention, are clear.

In particular, these advantages consist in the fact that the previsions according to the present invention allow the indication of a system 1 for preventing aquaplaning, implemented in such a way to take into due consideration the real dynamic state of the vehicle V and the aerodynamic flows that hit said vehicle V according to the dynamic state.

In fact, in agreement with the present invention, the injection of fluid F is carried out without ever exclusively taking into consideration the direction of the wheels R, but always taking in consideration the important factors of the travel direction DM of the vehicle V and the aerodynamic flow to be contrasted according to the travel direction DM of the vehicle V, whose importance increases in a proportional manner with respect to the increase in speed of said vehicle V.

Moreover, the previsions according to the present invention allow the indication of a system for preventing aquaplaning in a vehicle V, implemented in such a way as to generate a jet of fluid F to remove the water from an area of affected street surface S from the wheel, as well as to prevent projecting the water onto the area of street surface S towards which the wheel is directed.

It is therefore clear that the system 1 according to the present invention is implemented in such a way as to offer greater safety and reliability, in particular being able to effectively adapt itself in an automatic manner to the various driving conditions of the vehicle V.

It is, however, evident that numerous variations to the system are possible for preventing aquaplaning, as it is clear that, in its practical implementation, the forms and arrangements of the various details can be different, and they can be replaced with technically equivalent elements, without thereby departing from the innovative scope inherent in the inventive idea.

Figure 5A:
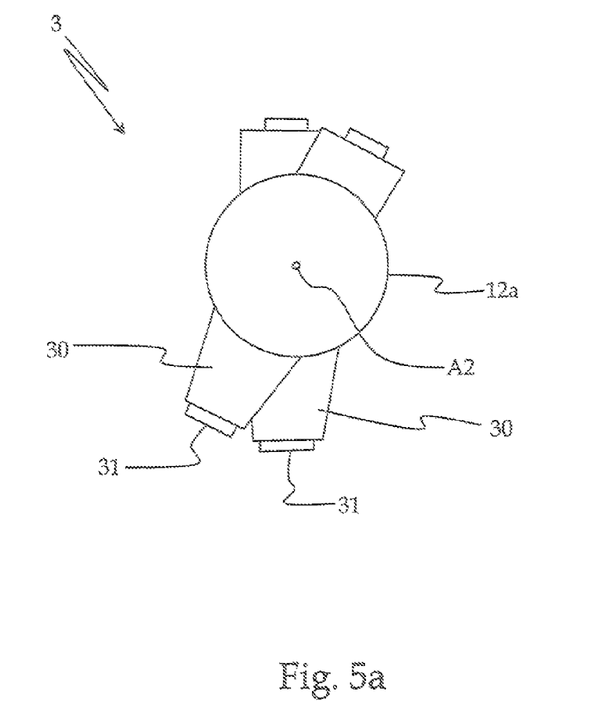
FIGS. 5a and 5b represent, respectively, a lateral view and a plan view of a variant of some components of the system for preventing aquaplaning according to the present invention.
Figure 5B:
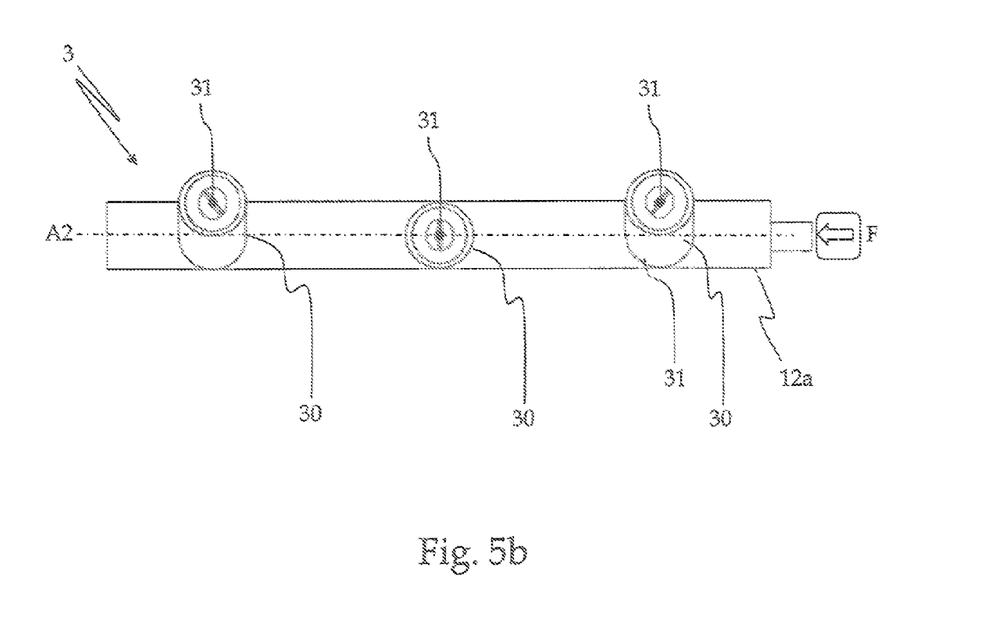

Among the multiple possible variations, the one shown in FIGS. 5a and 5b is cited as an example, which represent, respectively, a side view and a plan view of injector means 3 according to the present invention.

According to this variation, the system 1 comprises at least one nozzle 30 associated with activation means (not represented in the attached figures; it should be noted, however, that these activation means can also correspond to drive means 32, represented in simplified form in FIGS. 2a and 3a), which allow said at least one nozzle 30 to rotate around a second rotation axis A2 (shown with a point in FIG. 5a and with a dotted-dashed line in FIG. 5b), in particular said second rotation axis A2 essentially coincides with a longitudinal axis on which the terminal part 12a of the duct 12 is developed in a prevalent manner; in essence, said second rotation axis A2 develops in an essentially parallel manner to a transversal plane of the vehicle (or rather, develops along an essentially perpendicular direction with respect to the travel direction DM of the vehicle V).

Preferably, in the variation shown in FIGS. 5a and 5b, the control unit 4 is also configured for controlling said activation means according to the information revealed by the sensor means 2 and/or the information rendered available by other electronic devices present on the vehicle V. Consequently, the control unit 4 is configured in order to determine, in a continuous manner, the best rotation angle of the nozzle 30 with respect to the second rotation axis A2 by means of a mathematical algorithm deriving from the summary of all the information revealed by sensor means 2 and/or electronic devices of the vehicle V and analyzed by the control unit 4.

Therefore, it is easily comprehensible that the present invention is not limited to the system for preventing aquaplaning, but is subject to several modifications, improvements, and substitutions of equivalent parts and elements without, however, departing from the idea of the invention, as specified in the following claims.

The invention claimed is:

1. A system for preventing aquaplaning in a vehicle, the system comprising:
   a tank suitable for containing a fluid;
   sensor means configured to reveal conditions of the vehicle or an environment in which the vehicle is found, the environment including conditions of a street surface;
   injector means configured to generate a jet of fluid on the street surface, the injector means being associated with at least one wheel of the vehicle and including a least one nozzle with an outlet opening configured to create a flat jet of fluid;

a control unit associated with the sensor means and configured for controlling the injector means according to the conditions revealed by the sensor means; and a drive means connected to the control unit, which is configured to control the drive means according to the conditions revealed by the sensor means and in such a way as to orient the outlet opening in a travel direction of the vehicle, wherein the drive means causes the at least one nozzle to rotate around a rotation axis coincident with an axis of the outlet opening in accordance with a command from the control unit based on the conditions revealed by the sensor means.

2. The system according to claim 1, characterized in that the outlet opening presents an elliptic or rectangular shape.

3. The system according to claim 1, characterized in that the drive means comprises a magnetic or electromagnetic-system, which orients the nozzle and a direction of the jet of fluid following commands given by the control unit.

4. The system according to claim 1, wherein the at least one nozzle is movable along a guide parallel to a transversal plane of the vehicle.

5. The system according to claim 4, characterized in that the guide is associated with a terminal part of a duct for passage of the fluid.

6. The system according to claim 1, characterized in that the injector means includes a plurality of nozzles and each of the plurality of nozzles is equipped with an outlet opening suitable for creating a flat jet of fluid.

7. The system according to claim 6, characterized in that the plurality of nozzles are associated with the drive means, which allow each of the plurality of nozzles to rotate around its own rotation axis coincident with an axis of the outlet opening of each respective nozzle.

8. The system according to claim 7, characterized in that each one of the plurality of nozzles is rotated by the control unit, independently with respect to the other of the plurality of nozzles.

9. The system according to claim 6, characterized in that the plurality of nozzles are positioned in succession along a direction parallel to a transversal plane of the vehicle.

10. The system according to claim 6, characterized in that each nozzle of the plurality of nozzles is movable along a guide parallel to a transversal plane of the vehicle, the guide being associated with a duct for passage of the fluid.

11. The system according to claim 1, characterized in that at least one nozzle is associated with an activation means, which allows the at least one nozzle to rotate around a second rotation axis, the second rotation axis coincident with a longitudinal axis of a duct for passage of the fluid.

12. The system according to claim 1, characterized in that the injector means comprises at least one pump for generating an operation pressure of the fluid, wherein the operation pressure of the fluid is between 30 bar and 130 bar.

13. The system of claim 1, wherein the drive means comprise a motor associated with the at least one nozzle and controlled by the control unit.

14. A system for preventing aquaplaning in a vehicle, said system comprising:
a tank suitable for containing a fluid;
sensor means configured to reveal the conditions of the vehicle or an environment in which the vehicle is found, the environment including conditions of a street surface;
injector means configured to generate a jet of fluid on the street surface, the injector means being associated with at least one wheel of the vehicle and including at least one nozzle with an outlet opening configured to create a flat jet of fluid;
a control unit associated with the sensor means and configured for controlling the injector means according to the conditions revealed by the sensor means, and
a drive means connected to the control unit, which is configured to control the drive means according to the conditions revealed by the sensor means and in such a way as to orient the outlet opening in a travel direction of the vehicle,
wherein the drive means comprise a magnetic or electromagnetic-system, which orients the nozzle and a direction of the jet of fluid following commands given by the control unit, and
wherein the drive means causes the at least one nozzle to rotate around a rotation axis coincident with an axis of the outlet opening in accordance with a command from the control unit based on the conditions revealed by the sensor means.

15. The system of claim 14, wherein the at least one nozzle is associated with an activation means, which allows the at least one nozzle to rotate around a second rotation axis, the second rotation axis coincident with a longitudinal axis of a duct for passage of the fluid.

16. A system for preventing aquaplaning in a vehicle, the system comprising:
a tank suitable for containing a fluid;
sensor means configured to reveal the conditions of the vehicle or an environment in which the vehicle is found, the environment including conditions of a street surface;
injector means configured to generate a jet of fluid on the street surface, the injector means being associated with at least one wheel of the vehicle and including a plurality of nozzles, each nozzle including an outlet opening configured to create a flat jet of fluid, each nozzle movable along a guide parallel to a transverse plane of the vehicle, the guide being associated with a duct for the passage of the fluid;
a control unit associated with said sensor means and configured for controlling a drive means to move the injector means according to the conditions revealed by the sensor means; and
wherein the drive means causes each nozzle to rotate around a rotation axis coincident with an axis of the outlet opening in accordance with a command from the control unit based on the conditions revealed by the sensor means.

17. The system of claim 16, wherein the drive means comprise a motor associated with the at least one nozzle and controlled by the control unit.

18. The system of claim 16, wherein the at least one nozzle is associated with an activation means, which allows the at least one nozzle to rotate around a second rotation axis, the second rotation axis coincident with a longitudinal axis of the duct for passage of the fluid.

19. A system for preventing aquaplaning in a vehicle, the system comprising:
a tank suitable for containing a fluid;
sensor means configured to reveal the conditions of the vehicle or an environment in which the vehicle is found, the environment including conditions of a street surface;

injector means configured to generate a jet of fluid on the street surface, the injector means being associated with at least one wheel of the vehicle and including at least one nozzle with an outlet opening configured to create a flat jet of fluid;

a control unit associated with the sensor means and configured for controlling the injector means according to the conditions revealed by the sensor means;

drive means connected to the control unit, which is configured to control the drive means according to the conditions revealed by the sensor means and in such a way as to orient the outlet opening in a travel direction of the vehicle, wherein the drive means causes the at least one nozzle to rotate around a rotation axis coincident with an axis of the outlet opening in accordance with a command from the control unit based on the conditions revealed by the sensor means; and an activation means associated with each of the at least one nozzle, which allows the at least one nozzle to rotate around a second rotation axis, the second rotation axis coincident with a longitudinal axis of a duct for passage of the fluid.

20. The system of claim 19, wherein the drive means comprise a motor associated with the at least one nozzle and controlled by the control unit.

* * * * *